(12) United States Patent
Igarashi

(10) Patent No.: US 9,217,948 B2
(45) Date of Patent: Dec. 22, 2015

(54) OPTICAL SCANNING APPARATUS AND IMAGE FORMING APPARATUS EQUIPPED WITH SCANNING APPARATUS

(71) Applicant: CANON KABUSHIKI KAISHA, Tokyo (JP)

(72) Inventor: Jun Igarashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/249,194

(22) Filed: Apr. 9, 2014

(65) Prior Publication Data

US 2014/0307037 A1 Oct. 16, 2014

(30) Foreign Application Priority Data

Apr. 15, 2013 (JP) .................................. 2013-084686

(51) Int. Cl.

| | |
|---|---|
| B41J 15/14 | (2006.01) |
| B41J 27/00 | (2006.01) |
| G03G 15/04 | (2006.01) |
| G02B 26/12 | (2006.01) |
| G02B 27/00 | (2006.01) |

(52) U.S. Cl.
CPC ........ G03G 15/04045 (2013.01); G02B 26/123 (2013.01); G02B 27/0018 (2013.01); G03G 15/04072 (2013.01)

(58) Field of Classification Search
CPC . G02B 26/125; G02B 26/126; G02B 27/0018
USPC ......... 347/225, 230–233, 241, 243, 244, 256, 347/258–261; 359/205.1, 206.1, 363–366, 359/601
See application file for complete search history.

(56) References Cited

U.S. PATENT DOCUMENTS

| | | | | |
|---|---|---|---|---|
| 2009/0202273 | A1* | 8/2009 | Igarashi | 399/134 |
| 2012/0057903 | A1* | 3/2012 | Tomioka | 399/151 |

FOREIGN PATENT DOCUMENTS

| | | | | |
|---|---|---|---|---|
| JP | 2008-15139 A | | 1/2008 | |
| JP | 2008015139 A | * | 1/2008 | ............. G02B 26/10 |

* cited by examiner

*Primary Examiner* — Hai C Pham
(74) *Attorney, Agent, or Firm* — Canon USA Inc. IP Division

(57) ABSTRACT

An optical scanning apparatus includes, a deflection unit configured to deflect first and second light fluxes in a main scanning direction by a same deflection surface, an incident optical system configured to cause the first and second light fluxes to enter the deflection surface, and an imaging optical system configured to converge the first and second light fluxes deflected by the deflection unit to first and second surfaces to be scanned, respectively. The imaging optical system includes first imaging optical element having an output surface including first and second curves that the first and second light fluxes respectively enter, and among light rays included in the first and second light fluxes, the light rays that are reflected by the first and second curves, intersect each other in a sub-scanning cross section perpendicular to the main scanning direction.

17 Claims, 13 Drawing Sheets

OPTICAL SCANNING APPARATUS AND IMAGE FORMING APPARATUS EQUIPPED WITH SCANNING APPARATUS

BACKGROUND OF THE INVENTION

1. Field of the Invention

The present invention relates to an optical scanning apparatus and an image forming apparatus. The optical scanning apparatus is considered particularly suitable for an image forming apparatus such as a laser beam printer (LBP), a digital copying machine, and a multifunction printer (MFP) configured to perform an electrophotography process.

2. Description of the Related Art

Conventionally, an image forming apparatus such as a LBP, MFP and digital copying machine employs an optical scanning apparatus. In such an optical scanning apparatus, light fluxes that are light-modulated and emitted from a light source (laser or the like) in response to an image signal are periodically deflected by a deflection unit including, for example, a rotational polygon mirror (polygon mirror). Then, the deflected light fluxes are converged in the form of a spot on a photosensitive surface (surface to be scanned) of a photosensitive member (image bearing member) by an imaging optical system having fθ characteristics, and then the photosensitive surface is optically scanned to record an image.

In a color image forming apparatus, an optical scanning apparatus having a single deflection unit is shared by a plurality of photosensitive members and a plurality of light fluxes is caused to obliquely enter a same deflection surface of the deflection unit within a sub-scanning cross section to simultaneously scan a plurality of photosensitive surfaces. Japanese Patent Application Laid-Open No. 2008-15139 discusses an arrangement in which light fluxes deflected by the same deflection surface of a deflection unit are respectively guided to corresponding photosensitive surfaces via a single image forming lens to simplify optical members and reduce the size of the entire optical system.

However, the arrangement discussed in Japanese Patent Application Laid-Open No. 2008-15139 has a problem in that a part of the light fluxes is reflected by a surface of the image forming lens and the deflection surface to become unnecessary light (ghost light) entering a photosensitive surface that is to be scanned by another light flux. Furthermore, an arrangement in which imaging optical systems are provided on both sides of a deflection unit to sandwich the deflection unit has a problem that light reflected by a lens surface of one of the imaging optical systems enters as unnecessary light (ghost light) into another imaging optical system across the deflection unit.

SUMMARY OF THE INVENTION

The present invention addresses to above-described and other shortcomings of the conventional art, by providing an optical scanning apparatus capable of preventing generation of unnecessary light (ghost light) in an imaging optical element through which a plurality of light fluxes passes, and by providing an image forming apparatus using such an optical scanning apparatus.

According to an aspect of the present invention, an optical scanning apparatus includes, a deflection unit configured to deflect first and second light fluxes in a main scanning direction by a same deflection surface, an incident optical system configured to cause the first and second light fluxes to enter the deflection surface, and an imaging optical system configured to converge the first and second light fluxes deflected by the deflection unit to first and second surfaces to be scanned, respectively. The imaging optical system includes first imaging optical element having an output surface including first and second curves that the first and second light fluxes respectively enter, and among light rays included in the first and second light fluxes, the light rays that are reflected by the first and second curves intersect each other in a sub-scanning cross section perpendicular to the main scanning direction.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

(Image Forming Apparatus)

Figure 12:
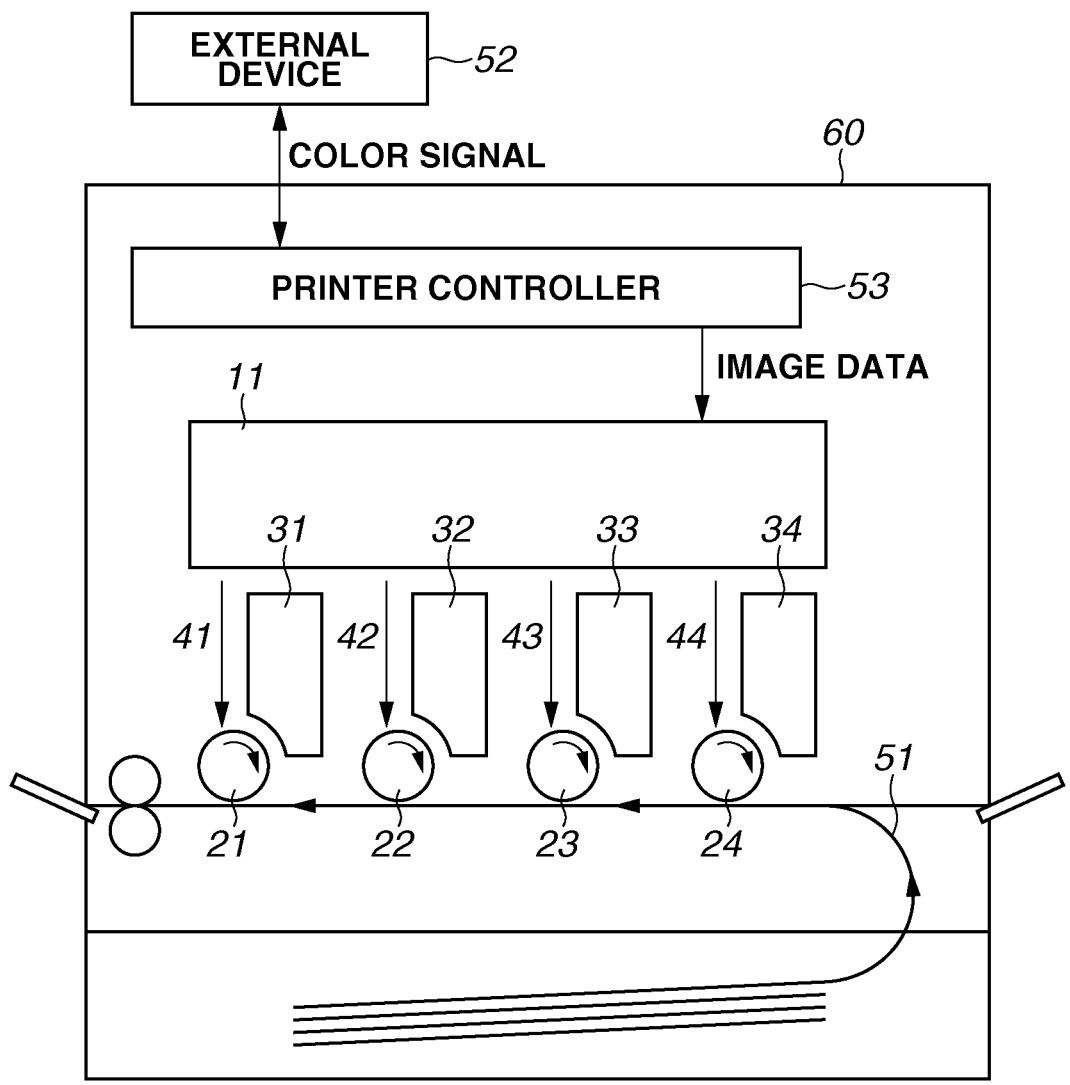
FIG. 12 is a schematic diagram illustrating a substantial part of a color image forming apparatus according to an exemplary embodiment of the present invention.

FIG. 12 is a schematic diagram illustrating a substantial part of a color image forming apparatus including an optical scanning apparatus according to a first exemplary embodiment of the present invention. The color image forming apparatus of the exemplary embodiment is a tandem type color image forming apparatus in which an optical scanning apparatus performs scanning with four beams to record image information in parallel on photosensitive members that are image bearing members. FIG. 12 illustrates a color image forming apparatus 60, an optical scanning apparatus 11 having a configuration of any one of first to third exemplary embodiments, photosensitive drums 21, 22, 23, and 24, each of which is an image bearing member, developing units 31, 32, 33, and 34, each of which develops a toner image, and a conveyance belt 51.

In FIG. 12, color signals of R (red), G (green), and B (blue) are input from an external device 52 such as a personal computer to the color image forming apparatus 60. A printer controller 53 in the color image forming apparatus 60 converts the color signals into image data (dot data) of Y (yellow), M (magenta), C (cyan), and K (black). The image data is input to the optical scanning apparatus 11. The optical scanning apparatus 11 emits light beams 41, 42, 43, and 44 modulated according to the image data, and photosensitive surfaces of the photosensitive drums 21, 22, 23, and 24 are scanned with the light beams in a main scanning direction.

In the color image forming apparatus 60 according to the present exemplary embodiment, the optical scanning apparatus 11 performs scanning with four beams that respectively correspond to Y (yellow), M (magenta), C (cyan), and K (black). Then, the optical scanning apparatus 11 records image signals (image information) on the surfaces of the photosensitive drums 21, 22, 23, and 24 in parallel to print a color image at high speed.

In the color image forming apparatus 60 according to the present exemplary embodiment, the optical scanning apparatus 11 forms electrostatic latent images of the respective colors on the corresponding photosensitive surfaces (surfaces of the photosensitive drums 21, 22, 23, and 24) by use of the light beams each of which is based on corresponding image data, as described above. Then, a transfer device transfers the multiple images onto a transfer material (recording material) to form one full-color image. Thereafter, the transferred toner image is fixed by the fixing device on the material.

An example of the external device 52 that can be used is a color image reading device including a charge coupled device (CCD) sensor. In this case, the color image reading device and the color image forming apparatus 60 constitute a color digital copying machine.

(Optical Scanning Apparatus)

Figure 1A:
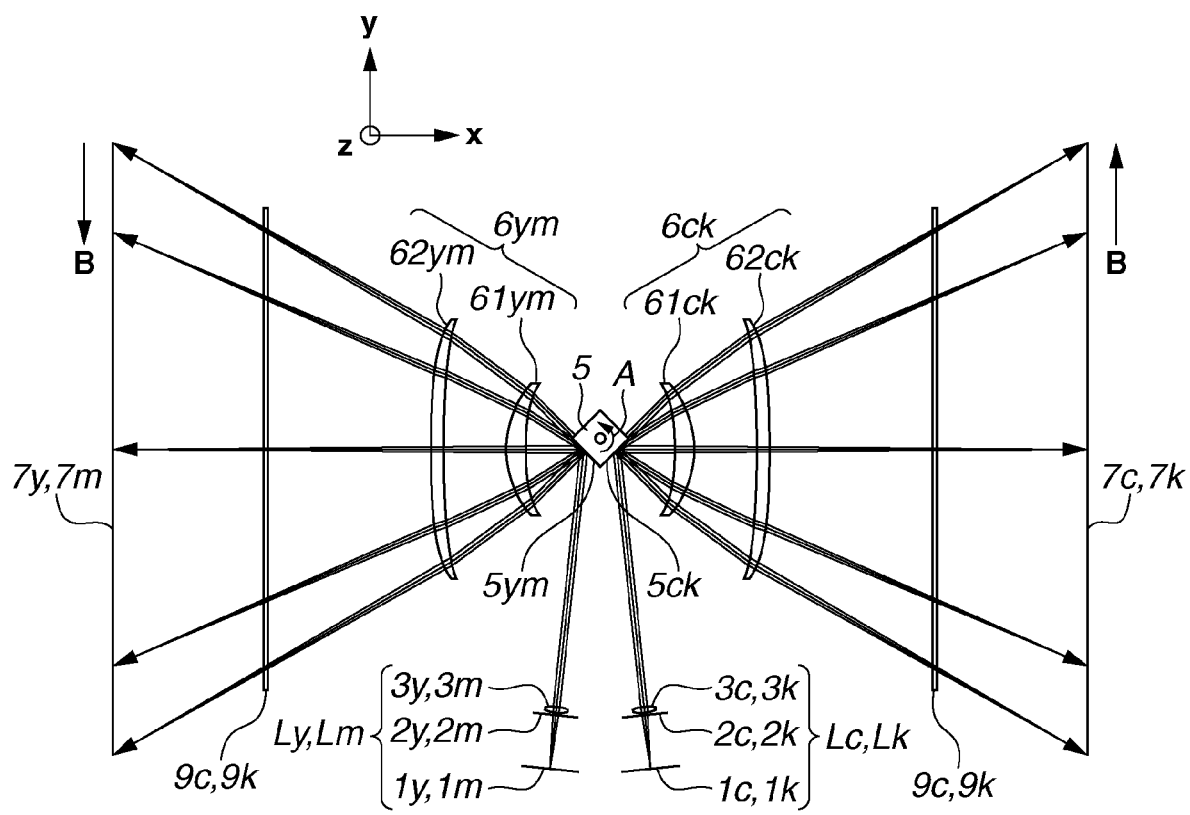
FIG. 1A illustrates a main-scanning cross section of a tandem type optical scanning apparatus according to a first exemplary embodiment of the present invention.
Figure 1B:
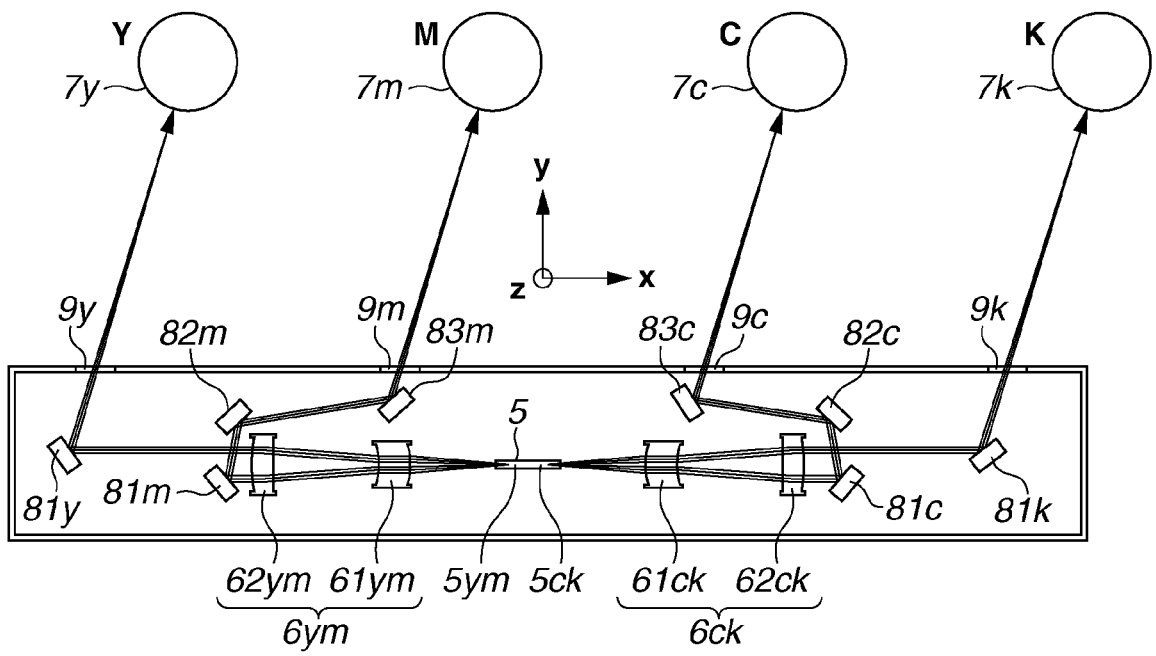
FIG. 1B illustrates a sub-scanning cross section of the optical scanning apparatus according to the first exemplary embodiment.

FIG. 1A is a cross sectional view (main-scanning cross sectional view) illustrating a substantial part of the tandem type optical scanning apparatus according to the first exemplary embodiment of the present invention in the main scanning direction. FIG. 1B is a cross sectional view (sub-scanning cross sectional view) of the substantial part in a sub-scanning direction. Hereinafter, the main scanning direction (Y-direction) refers to a direction that is perpendicular to a rotational axis of a deflection unit and is also perpendicular to an optical axis of an imaging optical system (X-direction) (direction in which a light flux is deflected for scanning by the deflection unit). The sub-scanning direction (Z-direction) refers to a direction that is parallel to the rotational axis of the deflection unit. A main-scanning cross section is a plane that includes the optical axis of the imaging optical system and the main scanning direction. A sub-scanning cross section is a cross section that includes the optical axis of the imaging optical system and is perpendicular to the main-scanning cross section.

In FIG. 1A, light sources $1y$, $1m$, $1c$, and $1k$ each include a semiconductor laser. Aperture diaphragms $2y$, $2m$, $2c$, and $2k$ are configured to respectively shape divergent light fluxes emitted from the light sources $1y$, $1m$, $1c$, and $1k$, each including a light emitting member, into particular beam shapes. Condensing lenses (anamorphic lens) $3y$, $3m$, $3c$, and $3k$ have refractive power (power) that differs in the main scanning direction (in the main-scanning cross section) and the sub-scanning direction (in the sub-scanning cross section).

Thus, the divergent light fluxes having passed through the aperture diaphragms $2y$, $2m$, $2c$, and $2k$ are converted into parallel light fluxes (or convergent light flux) in the main scanning direction and convergent light fluxes in the sub-scanning direction. In other words, the condensing lenses $3y$, $3m$, $3c$, and $3k$ function as a light flux converting member configured to change a condensed state of each light flux. Each of the light sources $1y$, $1m$, $1c$, and $1k$, the aperture diaphragms $2y$, $2m$, $2c$, and $2k$, and the condensing lenses $3y$, $3m$, $3c$, and $3k$ constitutes an element of incident optical systems Ly, Lm, Lc, and Lk.

The incident optical systems Ly, Lm, Lc, and Lk guide a plurality of light fluxes emitted from the light sources $1y$, $1m$, $1c$, and $1k$ to a deflection surface $5ym$ or $5ck$ of a deflection unit 5, which will be described below. The condensing lenses $3y$, $3m$, $3c$, and $3k$ may be formed by two optical devices (collimator lens and cylindrical lens). The condensing lenses $3y$, $3m$, $3c$, and $3k$ may be combined together. The deflection unit 5 is rotated at constant speed (constant angular speed) in the direction of an arrow A specified in FIG. 1A by a driving member (not illustrated) including a motor. Imaging optical systems $6ym$ and $6ck$ have light condensing functions and fθ characteristics.

The imaging optical systems $6ym$ and $6ck$ according to the present exemplary embodiment include first and second image forming lenses (scanning lens) $61ym$, $62ym$, $61ck$, and $62ck$, which are imaging optical elements having power that differs between the main scanning direction (in the main-scanning cross section) and the sub-scanning direction (in the sub-scanning cross section). The first and second image forming lenses $61ym$, $62ck$, $61ck$, and $62ck$ according to the present exemplary embodiment are made of a light-transmissive plastic material (resin) that transmits light fluxes. The first and second image forming lenses $61ym$, $62ck$, $61ck$, and $62ck$ form images of a plurality of light fluxes deflected by the deflection surface $5ym$ or $5ck$ of the deflection unit 5 according to image information, on photosensitive drum surfaces $7y$, $7m$, $7c$, and $7k$ (on surfaces to be scanned), which are surfaces different from each other.

The first and second image forming lenses $61ym$, $62ym$, $61ck$, and $62ck$ establish a conjugate relationship between the deflection surfaces $5ym$ and $5ck$ of the deflection unit 5 and the photosensitive drum surfaces $7y$, $7m$, $7c$, and $7k$ in the sub-scanning cross section to compensate for a plane tilt of the deflection surfaces $5ym$ and $5ck$. The first image forming lenses $61ym$ and $61ck$ have positive power in the main-scanning cross section on the optical axis of the first image forming lenses but does not have power in the sub-scanning cross section. The photosensitive drum surfaces (photosensitive drum) $7y$, $7m$, $7c$, and $7k$ are surfaces to be scanned.

Dust-proof glasses $9y$, $9m$, $9c$, and $9k$ are disposed between the imaging optical systems $6ym$ and $6ck$ and the surfaces to be scanned $7y$, $7m$, $7c$, and $7k$ to prevent dust from entering the optical scanning apparatus 11.

The optical scanning apparatus 11 according to the present exemplary embodiment is a tandem type optical scanning apparatus having above-described four scanning functions to simultaneously record image information corresponding to different hues on different surfaces to be scanned. The following describes the tandem type optical scanning apparatus in detail.

The four light sources 1y, 1m, 1c, and 1k according to the present exemplary embodiment are disposed apart from each other in the main scanning direction and the sub-scanning direction to form a rectangular shape in its entirety. Light fluxes from the light sources 1c and 1k enter the deflection surface 5ck of the deflection unit 5, light fluxes from the light sources 1y and 1m enter the deflection surface 5ym of the deflection unit 5. The light fluxes are then separated to the right and left of the deflection unit 5. Furthermore, the light fluxes from the light sources 1c and 1k are caused to obliquely enter the deflection unit 5 at different incidence angles in the sub-scanning cross section so that a mirror 81c disposed at the back of the first image forming lens 61ck and the second image forming lens 62ck spatially separates the light fluxes. The foregoing also applies to light fluxes from the light sources 1y and 1m.

As described above, the light fluxes having different oblique incidence angles with respect to the deflection unit 5 are caused to enter the two different deflection surfaces 51ym and 51ck of the deflection unit 5, so that the single deflection unit 5 can scan the four light fluxes at the same time.

The light fluxes from the light sources 1y and 1k toward the surfaces 7y and 7k to be scanned, which are on the spatially (physically) furthermost sides from the deflection unit 5, are deflected for scanning by the deflection unit 5, respectively deflected by single reflection devices 81y and 81k, and then respectively guided to the surfaces to be scanned 7y and 7k. Hereinafter, an optical path of a light flux from the light source 1y or 1k toward the surface to be scanned 7y or 7k will be referred to as an "outer optical path."

On the other hand, the light fluxes from the light sources 1m and 1c toward the surfaces 7m and 7c to be scanned, which are on the spatially (physically) closest sides to the deflection unit 5, are deflected for scanning by the deflection unit 5 and thereafter respectively deflected by three reflection devices 81m, 82m, and 83m, and 81c, 82c, and 83c. Then, the light fluxes are respectively guided to the surfaces 7m and 7c to be scanned. Hereinafter, an optical path of a light flux from the light source 1m or 1c toward the surface 7m or 7c to be scanned will be referred to as an "inner optical path."

The number of reflection devices in the outer optical path is different from that in the inner optical path, because the layout is determined based on physical interference between an optical device and an optical path, ease of assembly, and the like under constraint conditions that all optical paths are arranged to have the same optical path length. While the present exemplary embodiment describes that the number of reflection devices is three in the inner optical path and one in the outer optical path, the number of reflection devices is not limited to those described in the present exemplary embodiment. The number of reflection devices in the inner optical path and the outer optical path can be determined based on spaces between a plurality of surfaces to be scanned, the position of an imaging optical element, etc.

(Optical Scanning System)

Lens surface shapes and optical arrangement according to the present exemplary embodiment are shown in Table 1 as specific numerical examples of an optical scanning system.

TABLE 1

| Imaging optical system data | | | |
|---|---|---|---|
| Oblique incidence angle in main-scanning cross section | [degree] | | 84 |
| Oblique incidence angle in sub-scanning cross section | [degree] | γ | 3 |
| fθ coefficient | [mm/rad] | f | 189 |
| Wavelength of light source | [nm] | λ | 790 |
| Refractive index of image forming lens | | N | 1.523972 |
| Maximum deflection angle | [degree] | θmax | ±47.3 |
| Deflection point - incident surface of image forming lens 61ym, 61ck | [mm] | D1 | 30.0 |
| Incident surface of image forming lens 61ym, 61ck - output surface of image forming lens 61ym, 61ck | [mm] | D2 | 10.5 |
| Output surface of image forming lens 61ym, 61ck - incident surface of image forming lens 62ym, 62ck | [mm] | D3 | 31.0 |
| Incident surface of image forming lens 62ym, 62ck - output surface of image forming lens 62ym, 62ck | [mm] | D4 | 6.5 |
| Output surface of image forming lens 62ym, 62ck - surface to be scanned | [mm] | D5 | 154.2 |
| Deflection point - surface to be scanned | [mm] | D | 232.2 |
| Effective scanning width | [mm] | W | 272 |

TABLE 1-continued

| | | | |
|---|---|---|---|
| Amount of shift of incident surface of image forming lens 62ym, 62ck in sub-scanning direction | [mm] | | 3.4 |
| Amount of shift of output surface of image forming lens 62ym, 62ck in sub-scanning direction | [mm] | | 3.65 |
| Number of surfaces of polygon mirror | [surface(s)] | | 4 |
| Diameter of circumscribed circle of polygon mirror | [φ] | | 20 |

| | | Image forming lens shape data | | | |
|---|---|---|---|---|---|
| | | Image forming lens 61ym, 61ck | | Image forming lens 62ym, 62ck | |
| | | Incident surface | Output surface | Incident surface | Output surface |
| Main scanning direction | R | −125.360 | −51.917 | −410.321 | −2775.692 |
| | K | −5.59E+00 | −3.37E+00 | −1.41E+01 | 1.61E+03 |
| | B4u | −1.28E−06 | −2.51E−06 | −1.48E−07 | −6.97E−07 |
| | B6u | 1.79E−10 | 1.00E−09 | −1.41E−11 | 6.25E−11 |
| | B8u | | −8.97E−13 | | −6.26E−15 |
| | B10u | | 3.00E−16 | | −3.01E−19 |
| | B4l | −1.28E−06 | −2.51E−06 | −1.48E−07 | −6.97E−07 |
| | B6l | 1.79E−10 | 1.00E−09 | −1.41E−11 | 6.25E−11 |
| | B8l | | −8.97E−13 | | −6.26E−15 |
| | B10l | | 3.00E−16 | | −3.01E−19 |
| Sub-scanning direction | r | 25 | 25 | 200 | −27.243 |
| | D2u | | 7.64E−07 | −8.71E−07 | 5.21E−06 |
| | D4u | | 3.67E−09 | 5.54E−10 | −1.72E−09 |
| | D6u | | 3.29E−13 | −2.89E−13 | 3.53E−13 |
| | D8u | | 1.84E−16 | 2.54E−17 | −7.88E−17 |
| | D10u | | −1.53E−18 | 6.47E−21 | 1.24E−20 |
| | D2l | | 1.09E−06 | −8.71E−07 | 5.90E−06 |
| | D4l | | −9.11E−12 | 5.54E−10 | −2.55E−09 |
| | D6l | | −3.20E−14 | −2.89E−13 | 9.11E−13 |
| | D8l | | 4.09E−15 | 2.54E−17 | −2.38E−16 |
| | D10l | | −2.71E−18 | 6.47E−21 | 2.84E−20 |
| | M0_1u | | | −9.84E−03 | −9.50E−02 |
| | M2_1u | | | −1.00E−06 | 1.28E−05 |
| | M4_1u | | | 3.01E−09 | −2.72E−09 |
| | M6_1u | | | 4.25E−13 | 1.23E−12 |
| | M8_1u | | | −3.66E−16 | −1.83E−16 |
| | M10_1u | | | −1.78E−21 | −3.11E−20 |
| | M0_1l | | | −9.84E−03 | −9.50E−02 |
| | M2_1l | | | −4.20E−06 | 1.24E−05 |
| | M4_1l | | | 1.66E−09 | −5.81E−09 |
| | M6_1l | | | −4.56E−13 | 2.10E−12 |
| | M8_1l | | | −1.31E−16 | −5.91E−16 |
| | M10_1l | | | 2.55E−20 | 5.75E−20 |

According to the present exemplary embodiment, a generatrix shape of each of the incident surfaces and output surfaces of the first image forming lenses 61ym and 61ck and the second image forming lenses 62ym and 62ck is an aspherical surface that can be expressed as a function up to a 10th-order function. Each of the lens surfaces of the image forming lenses 61ym, 61ck, 62ym, and 62ck is defined by the aspherical surface formula specified below. Let an X-axis that passes through the origin of each lens surface indicate the optical axis direction, and let an axis that is perpendicular to the optical axis in the main-scanning cross section be Y-axis. Then, the shape of the lens surface in the generatrix direction corresponding to the main scanning direction is expressed as follows:

$$X = \frac{Y^2/R}{1 + (1 - (1+K)(Y/R)^2)^{1/2}} + B_4 Y^4 + B_6 Y^6 + B_8 Y^8 + B_{10} Y^{10} \quad \text{(Formula 1)}$$

(where R represents the radius of curvature of the generatrix, and K, $B_4$, $B_6$, $B_8$, and $B_{10}$ represent aspherical coefficients). Further, the shape of the lens surface in the sagittal direction corresponding to the sub-scanning direction is expressed as follows:

$$S = \frac{Z^2/r'}{1 + (1 - (Z/r')^2)^{1/2}} + \sum\sum M_{j-k} Y^j Z^k \quad \text{(Formula 2)}$$

where S represents the sagittal shape defined in a plane that includes a normal line of the generatrix line at respective positions in the generatrix direction and is perpendicular to the main-scanning cross section.

The radius of curvature r' in the sub-scanning direction at a position distant from the optical axis by Y in the main scanning direction (radius of curvature r' of the sagittal line) is expressed as follows:

$$1/r' = 1/r + D_2 Y^2 + D_4 Y^4 + D_6 Y^6 + D_8 Y^8 + D_{10} Y^{10} \quad \text{(Formula 3)}$$

(where r represents the radius of curvature of the sagittal line on the optical axis, and $D_2$, $D_4$, $D_6$, $D_8$, and $D_{10}$ represent sagittal line change coefficients). According to the present exemplary embodiment, |r1|>|r2|, where r1 represents the radius of curvature of the sagittal line on the optical axis of the incident surfaces of the imaging optical elements 62*ym* and 62*ck*, which are disposed at positions closest to the surfaces to be scanned, and r2 represents the curvature radius of the sagittal line on the optical axis of the output surfaces of the imaging optical elements 62*ym* and 62*ck*. Specifically, r1=200 and r2=−27.243, as shown in Table 1.

In the formula that represents S described above, $M_{j\_k}$ represents a coefficient indicating an aspherical surface in the sagittal direction. For example, $M_{j\_1}$ represents the first-order term of Z and also represents the tilt of the surface in the sub-scanning direction (tilt in the sagittal direction). According to the present exemplary embodiment, the tilt amount in the sagittal direction is changed along the main scanning direction by use of zero-th order, second-order, fourth-order, sixth-order, eighth-order, and tenth-order coefficients.

Furthermore, each of the coefficients shown in Table 1 is followed by one of suffixes u and l, which represent an "upper side" and a "lower side," respectively. A side on which the light sources 1*y*, 1*m*, 1*c*, and 1*k* are disposed relative to the vertexes of the lens surfaces of the imaging optical system is defined as "lower side," and a side opposite to the side on which the light sources 1*y*, 1*m*, 1*c*, and 1*k* are disposed is defined as "upper side." The coefficients having no suffix U and l represent coefficients common to the upper and lower sides.

According to the present exemplary embodiment, the first image forming lens 61*ym* and the second image forming lens 62*ym* are shared by the optical paths to the photosensitive drums 7*y* and 7*m*, as illustrated in FIG. 1B. Further, each of the incident surface and the output surface of the second image forming lens 62*ym* is a multi-stage toric surface formed by overlapping two toric surfaces with each other in the sub-scanning cross section.

Similarly, the first image forming lens 61*ck* and the second image forming lens 62*ck* are shared by the optical paths to the photosensitive drums 7*c* and 7*k*, as illustrated in FIG. 1B. Further, each of the incident surface and the output surface of the second image forming lens 62*ck* is a multi-stage toric surface formed by overlapping two toric surfaces with each other in the sub-scanning cross section.

(Prevention of Ghost Light)

Figure 2:
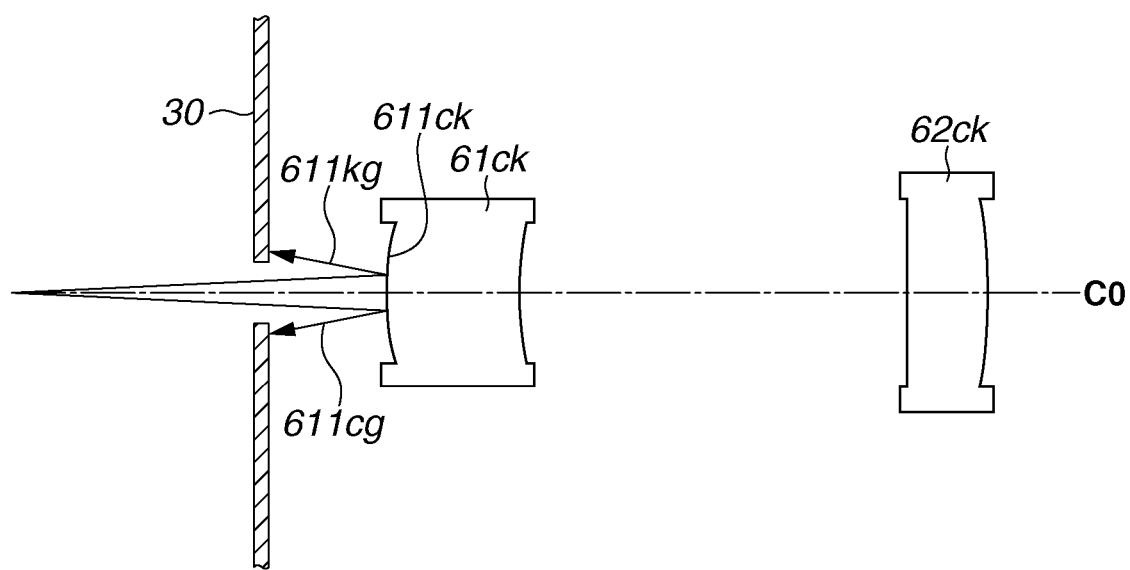
FIG. 2 is a sub-scanning cross sectional view illustrating ghost light generated by an incident surface of a first image forming lens according to the first exemplary embodiment of the present invention.
Figure 3:
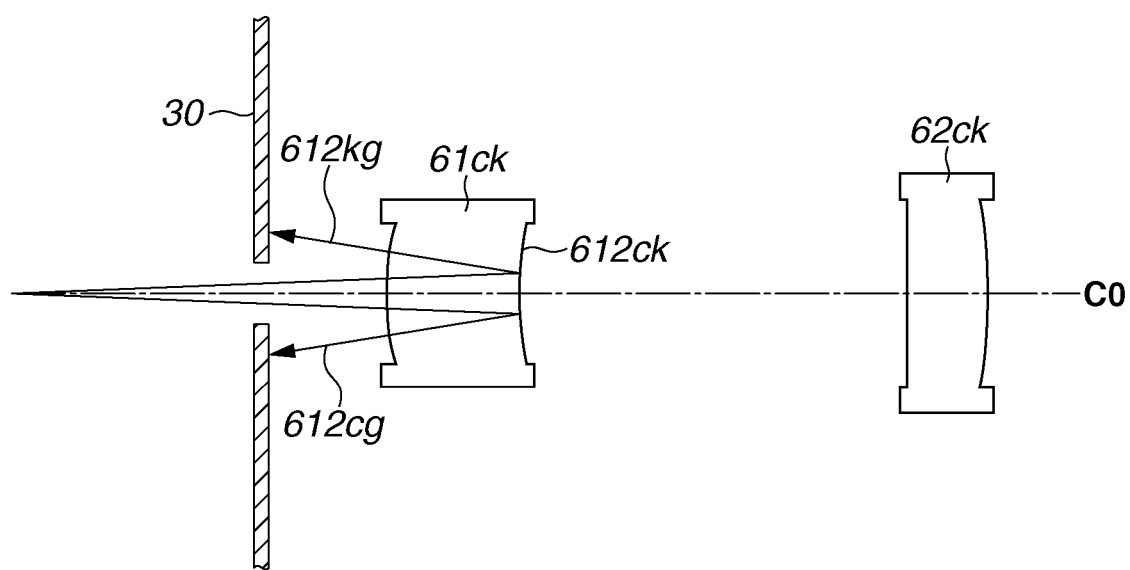
FIG. 3 is a sub-scanning cross sectional view illustrating ghost light generated by an output surface of the first image forming lens according to the first exemplary embodiment of the present invention.
Figure 4:
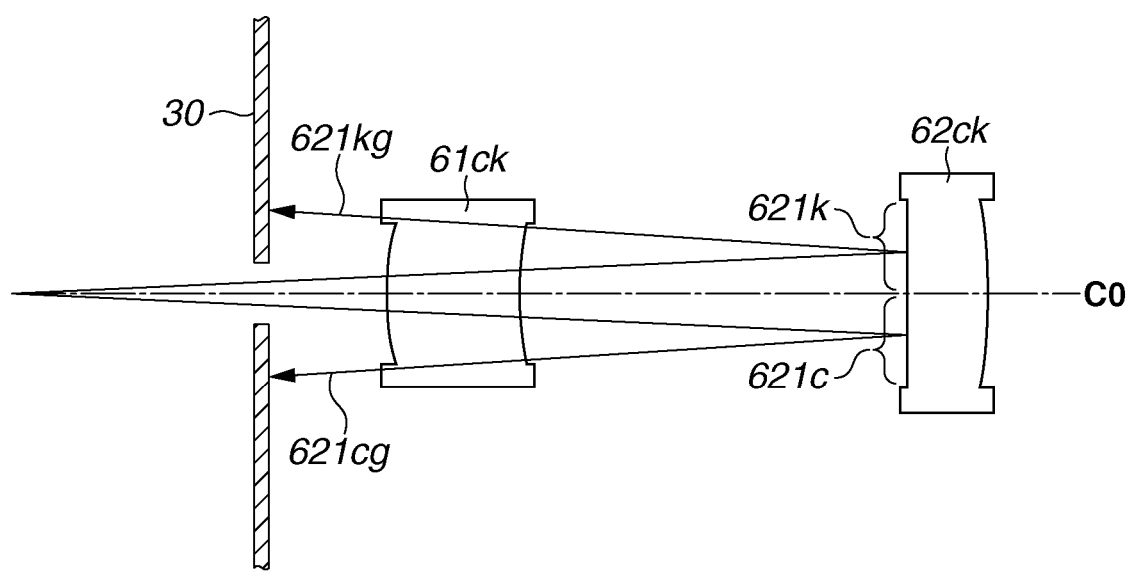
FIG. 4 is a sub-scanning cross sectional view illustrating ghost light generated by an incident surface of the second image forming lens according to the first exemplary embodiment of the present invention.

The following describes a technical solution for preventing ghost light, which is an object of the present exemplary embodiment, and advantages. FIG. 2 is a sub-scanning cross sectional view illustrating ghost light originating from light reflected by the incident surface of the first image forming lens according to the present exemplary embodiment. FIG. 3 is a sub-scanning cross sectional view illustrating ghost light originating from light reflected by the output surface of the first image forming lens according to the present exemplary embodiment. FIG. 4 is a sub-scanning cross sectional view illustrating ghost light originating from light reflected by the incident surface of the second image forming lens according to the present exemplary embodiment. In the sub-scanning cross sections illustrated in FIGS. 2, 3, and 4, the clockwise direction treating the main scanning direction as the rotational axis is a direction CW, and the counterclockwise direction treating the main scanning direction as the rotational axis is a direction CCW.

A reference axis C0 is an axis that passes through an incidence point of a principal light ray of a light flux on a deflection surface of the deflection unit 5 in the sub-scanning cross section and is perpendicular to the deflection surface when the principal light ray of the light flux emitted from an incident optical system is deflected for scanning by the deflection surface to enter the center of a surface to be scanned.

As used herein, a principal light ray of a light flux refers to a light ray that passes through the center of the aperture diaphragm 2*y*, 2*m*, 2*c*, or 2*k*.

In FIG. 2, the incident surface 611*ck* in the sub-scanning cross section is set to have a convex shape with respect to the deflection unit 5. Hence, ghost light rays 611*cg* and 611*kg* generated by reflection from the incident surface 611*ck* of the first image forming lens 61*ck* reflect in directions coming away from the reference axis C0. Consequently, the ghost light is blocked by a first light blocking member 30 disposed between the deflection unit 5 and the first image forming lens 61*ck*. Accordingly, the ghost light does not enter the imaging optical system 6*ym*, which is disposed on the opposite side across the deflection unit 5, and, thus, does not reach the scan target surfaces 7*y* and 7*m*.

Similarly, in FIG. 3, the output surface 612*ck* in the sub-scanning cross section is set to have a convex shape with respect to the deflection unit 5. Hence, ghost light rays 612*cg* and 612 kg generated by reflection from the output surface 612*ck* of the first image forming lens 61*ck* are reflected in directions coming away from the reference axis C0. Consequently, the ghost light is blocked by the first light blocking member 30 disposed between the deflection unit 5 and the first image forming lens 61*ck*. Accordingly, the ghost light does not enter the imaging optical system 6*ym*, which is disposed on the opposite side across the deflection unit 5, and, thus, does not reach the scan target surfaces 7*y* and 7*m*.

Furthermore, in FIG. 4, the incident surfaces 621*c* and 621*k* in the sub-scanning cross section is set to have a convex shape with respect to the deflection unit 5. Hence, ghost light rays 621*cg* and 621*kg* generated by reflection from the incident surfaces 621*c* and 622*k* of the second image forming lens 62*ck* are reflected in directions coming away from the reference axis C0. Consequently, the ghost light is blocked by the first light blocking member 30 disposed between the deflection unit 5 and the first image forming lens 61*ck*. Accordingly, the ghost light does not enter the imaging optical system 6*ym*, which is disposed on the opposite side across the deflection unit 5, and, thus, does not reach the scan target surfaces 7*y* and 7*m*.

(Comparison to Comparative Example)

Figure 1C:
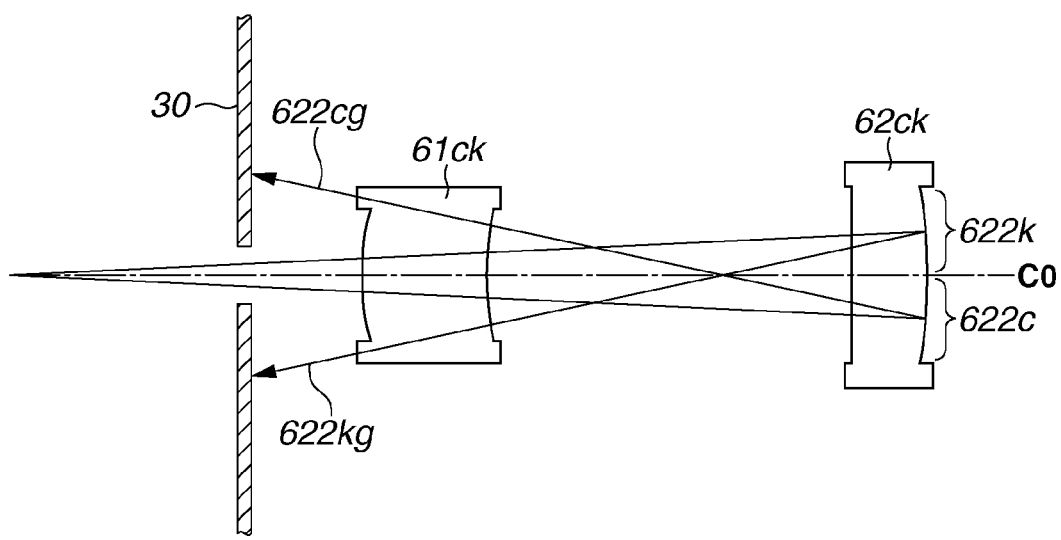
FIG. 1C is a sub-scanning cross sectional view illustrating ghost light generated by an output surface of a second image forming lens according to the first exemplary embodiment.
Figure 5:
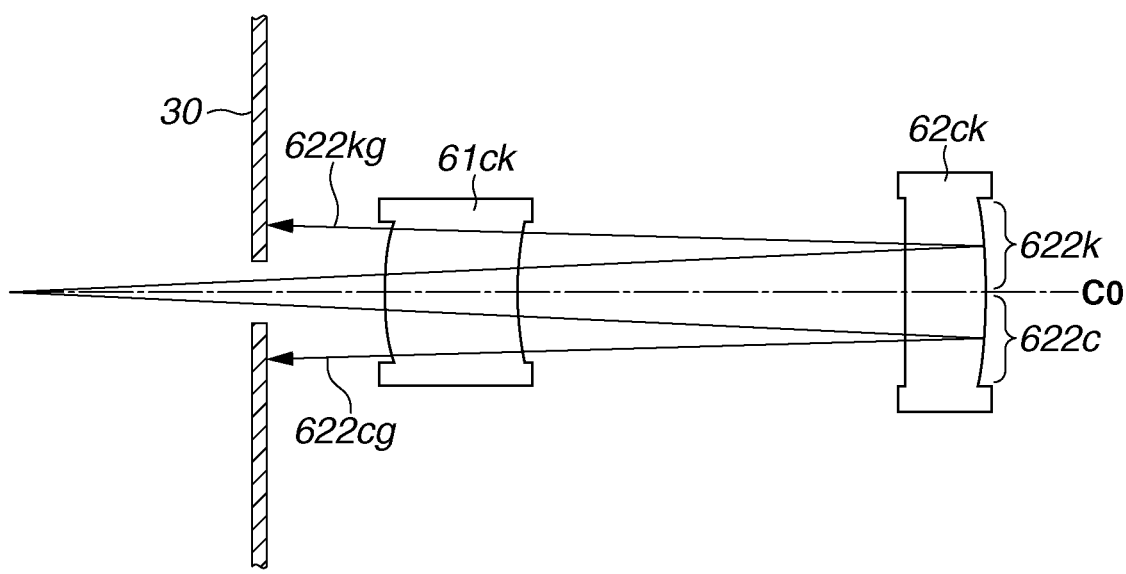
FIG. 5 is a sub-scanning cross sectional view illustrating ghost light generated by an output surface of a second image forming lens according to a comparative example.
Figure 6:
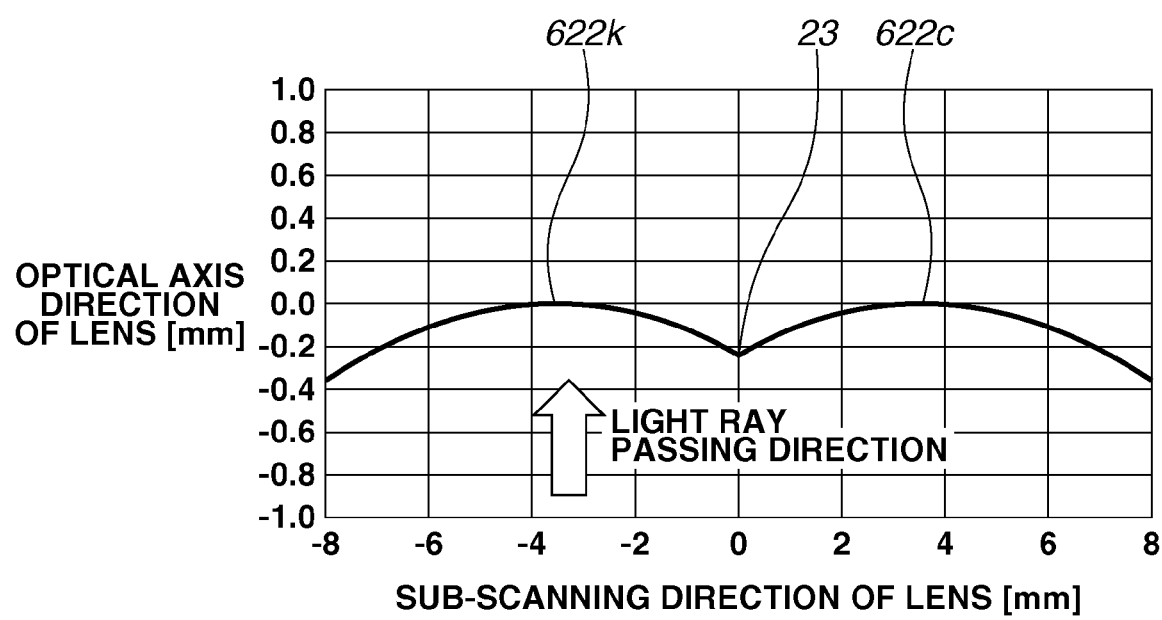
FIG. 6 is an enlarged view of the output surface of the second image forming lens according to the comparative example.
Figure 7:
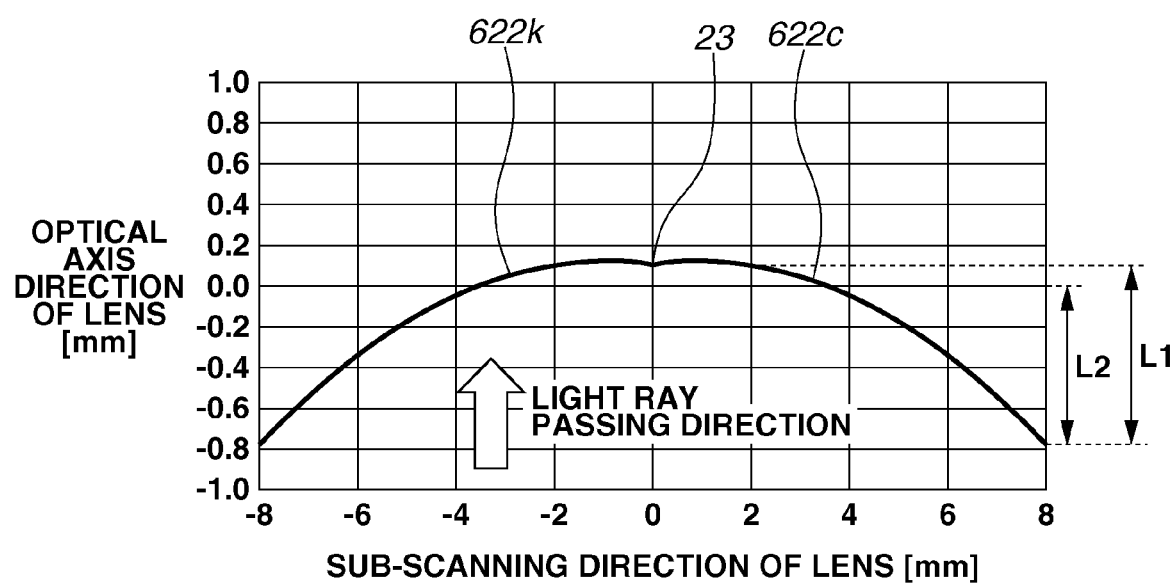
FIG. 7 is an enlarged view of the output surface of the second image forming lens according to the first exemplary embodiment of the present invention.

FIG. 5 is a sub-scanning cross sectional view illustrating ghost light generated by a second image forming lens according to a comparative example. FIG. 6 is an enlarged view of an output surface of the second image forming lens according to the comparative example. FIG. 1C is a sub-scanning cross sectional view illustrating ghost light generated by the second image forming lens 62*ck* according to the present exemplary embodiment. FIG. 7 is an enlarged view of the output surface of the second image forming lens 62*ck* according to the present exemplary embodiment.

If, similarly to the incident surface of the second image forming lens 62*ck*, the output surfaces 622*c* and 622*k* of the second image forming lens 62*ck* is set to have a convex shape with respect to the deflection unit 5 in the sub-scanning cross section, ghost light can be blocked as described above. However, since divergent light having entered the second image forming lens 62*ck* needs to be converged on a scan target surface within the sub-scanning cross section, the output surface of the second image forming lens in general has a concave shape with respect to the deflection unit 5.

In this case, ghost light rays 622*cg* and 622*kg* generated by the output surfaces 622*c* and 622*k* of the second image forming lens 62*ck* are also blocked by the first light blocking member 30, as illustrated in FIG. 5. Thus, the ghost light does not cause a problem.

However, the following problem arises. To correct spot rotation and scanning line curvature arising from the use of the sub-scanning oblique incidence optical system, the output surface of the second image forming lens 62*ck* is parallel-decentered in different sub-scanning directions as illustrated in FIG. 6. Specifically, the output surfaces 622*c* and 622*k* are parallel-decentered in the sub-scanning direction to have two divided curved areas. The curved areas of the cross sections of the output surfaces 622*c* and 622*k* are arcs. In the state illustrated in FIG. 6, a connecting portion 23, which is a boundary portion connecting the two output surfaces 622*c* and 622*k* together, lacks continuity and, furthermore, the angle is steep. Thus, the direction of contraction of the connecting portion 23 differs after forming.

Hence, the shape in the sub-scanning direction near the connecting portion 23 is likely to include peculiarity of an aspherical component (fourth order or higher) compared to the original arc shape, and this may also affect the shape of the positions of the output surfaces 622*c* and 622*k* through which light rays pass, which increases wave-front aberration of light fluxes.

To address the foregoing problem, the output surface 622*k* of the second image forming lens 62*ck* illustrated in FIG. 5 is tilt-decentered in the direction CCW, and the output surface 622*c* of the second image forming lens 62*ck* is tilt-decentered in the direction CW, treating the main scanning direction as the rotational axis in the present exemplary embodiment. As a result, ghost light reflected by the output surface 622*k* is reflected in the direction CCW relative to a light flux having entered the output surface 622*k*, and ghost light reflected by the output surface 622*c* is reflected in the direction CW relative to a light flux having entered the output surface 622*c*, as illustrated in FIG. 1C.

Specifically, according to the present exemplary embodiment, the plurality of curved areas (622*c*, 622*k*) in the output surface 622*k* of the second image forming lens 62*ck* is set such that each of reflected light rays of principal light rays of light fluxes having entered the curved areas intersects the reference axis C0, as illustrated in FIG. 1C. On the other hand, according to the comparative example, the plurality of curved areas (622*c*, 622*k*) of the output surface 622*k* of the second image forming lens 62*ck* is set such that each of reflected light rays of principal light rays of light fluxes having entered the curved areas does not intersect with the reference axis C0, as illustrated in FIG. 5.

Since the first light blocking member 30 disposed between the deflection unit 5 and the first image forming lens 61*ck* blocks the ghost light, the ghost light does not enter the imaging optical system 6*ym*, which is disposed on the opposite side across the deflection unit 5, and, thus, the ghost light does not reach the scan target surfaces 7*y* and 7*m*. Furthermore, as illustrated in FIG. 7, for example, the amount of sag of the connecting portion 23 of the output surfaces 622*k* and 622*c* is smaller than that in the comparative example, so that wave-front aberration near the connecting portion 23 is not likely to occur.

Since the connecting portion 23 of the output surfaces 622*k* and 622*c* is a portion that connects a plurality of areas defined by different functions, the connecting portion 23 is not a smooth curve (arc, polynomial, etc.). Thus, the slope is discontinuous. This, however, has only a minor effect on forming, because the output surfaces 622*c* and 622*k* of the second image forming lens 62*ck* are tilt-decentered in the direction in which the amount of sag of the connecting portion 23 decreases, treating the main scanning direction as the rotational axis. Furthermore, compared with the case in which the curved areas are connected together by a smooth curve, optical effective areas of the output surfaces 622*k* and 622*c* can be brought into closer proximity to each other.

This enables fluxes respectively passing through the output surfaces 622*k* and 622*c* to come into proximity to each other so that the height of the second image forming lens 62*ck* in the sub-scanning direction can be reduced.

In the present exemplary embodiment, the amount of sag is 0.1 mm, so that the sag is not likely to generate peculiarity that affects a light flux. If the amount of sag is reduced to 0.5 mm or smaller, the sag will not cause a problem.

While the foregoing describes the second image forming lens 62*ck*, if the foregoing arrangement is applied to the second image forming lens 62*ym* disposed on the opposite side across the deflection unit 5, a similar advantage can be obtained.

(Spot Shape)

Figure 8:
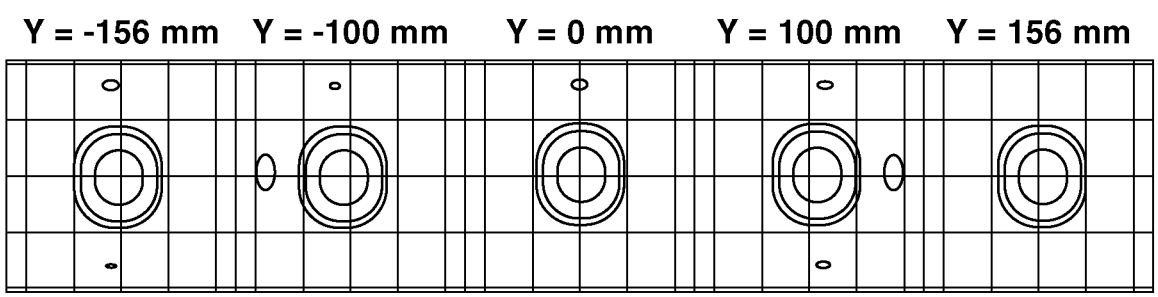
FIG. 8 illustrates spot diameters according to the first exemplary embodiment of the present invention.

FIG. 8 illustrates spot shapes according to the present exemplary embodiment. In the present exemplary embodiment, the output surface of the second image forming lens is tilt-decentered treating the main scanning direction as the rotational axis so that ghost light does not reach the surfaces to be scanned and, at the same time, it can be seen that the spot rotation is suitably corrected. As to the spot shapes illustrated in FIG. 8, the horizontal direction is the main scanning direction, and the vertical direction is the sub-scanning direction. The spot shapes are illustrated with contour lines of 5%, 13.5%, and 50% relative to the peak light amount.

(Principal Light Ray of Light Flux Incident on Output Surface of Imaging Optical Element Disposed at Position Closest to Surface to be Scanned, and Surface Normal Line at Incident Position on Output Surface)

In the present exemplary embodiment, $$0 \text{ (deg)} < \theta s \quad (1)$$

is satisfied, where θs represents an angle in the sub-scanning cross section, formed by a principal light ray of a light flux incident on an output surface of an imaging optical element disposed at a position closest to the surfaces to be scanned in the optical path and a surface normal line at a position through which the light flux enters the output surface. In the sub-scanning cross section, θs is positive in the direction in which the surface normal line at the position through which the principal light ray of the light flux enters the output surface of the imaging optical element disposed at the position closest to the surface to be scanned in the optical path, approaches the reference axis of the imaging optical system. If the condition (1) is not satisfied, it is not possible to prevent ghost light generated and reflected by the output surfaces from reaching the surfaces to be scanned on the opposite side across the deflection unit while the amount of sag of the connecting portion of the output surfaces 622k and 622c of the imaging optical element disposed at the position closest to the surface to be scanned in the optical path remains reduced. In the present exemplary embodiment, the value of θs is $$\theta s = 3.16 \text{ (deg)}.$$

Therefore, the conditional formula (1) is satisfied.

(Positional Relationship Between Position Through which Light Flux Enters Output Surface of Imaging Optical Element Disposed at the Position Closest to Surface to be Scanned, and the Connecting Portion)

As illustrated in FIG. 7, L1 represents a distance in the optical axis direction between a mirror surface end position of the output surface of the imaging optical element disposed at the position closest to the surfaces to be scanned in the optical path and the central position of the output surface in the sub-scanning cross section, and a distance L2 represents a distance in the optical axis direction between the mirror surface end position and a light flux incident position. Here, the mirror surface end position refers to the position of an end portion of an optical effective area (mirror surface) of an output surface in the sub-scanning cross section, and the central position refers to the central position of the optical effective area (mirror surface) of the output surface in the sub-scanning cross section. In the present exemplary embodiment, $$L1 > L2 \quad (2)$$

is satisfied.

If the conditional formula (2) is not satisfied, the central portion of the output surface of the imaging optical element in the sub-scanning cross section, i.e., the connecting portion 23 of the output surfaces 622k and 622c is on the side closer to the incident surface than the position through which the principal light ray of the light flux passes. In other words, the sag amount of the connecting portion 23 of the output surfaces 622k and 622c increases. This increases wave-front aberration near the connecting portion 23 at the time of formation of the imaging optical element. In the present exemplary embodiment, the values of the distances L1 and L2 are:

$$L1 = 0.88 \text{ (mm), and}$$

$$L2 = 0.78 \text{ (mm)}.$$

Thus, the conditional formula (2) is satisfied.

As to the imaging optical element disposed at the position closest to the deflection unit 5 in the optical path, an angle between the principal light ray of the light flux reflected by the incident surface illustrated in FIG. 2 and the reference axis is θgs1, and an angle between the principal light ray of the light flux reflected by the output surface as illustrated in FIG. 3 and the reference axis is θgs2. As to the imaging optical element disposed at the position closet to the surfaces to be scanned in the optical path, an angle between the principal light ray of the light flux reflected by the incident surface illustrated in FIG. 4 and the reference axis is θgs3, and an angle between the principal light ray of the light flux reflected by the output surface illustrated in FIG. 1C and the reference axis is θgs4. Under this situation, the following conditions are satisfied:

$$0 \text{ (deg)} > \theta sg1 \quad (3),$$

$$0 \text{ (deg)} > \theta sg2 \quad (4),$$

$$0 \text{ (deg)} > \theta sg3 \quad (5), \text{ and}$$

$$0 \text{ (deg)} < \theta sg4 \quad (6).$$

In the sub-scanning cross section, each of the angles θsg1, θsg2, θsg3, and θsg4 is positive in the direction approaching the reference axis. In the present exemplary embodiment, the values of the angles θsg1, θsg2, θsg3, and θsg4 are as follows:

$$sg1 = -10.2 \text{ (deg)},$$

$$sg2 = -8.6 \text{ (deg)},$$

$$sg1 = -2.0 \text{ (deg), and}$$

$$sg1 = 8.7 \text{ (deg)}.$$

Thus, the conditional formulas (3), (4), (5), and (6) are satisfied.

Advantages of the Present Exemplary Embodiment

The present exemplary embodiment can provide an optical scanning apparatus capable of preventing ghost light on lens surfaces of image forming lenses even if the image forming lenses are shared, and can provide an image forming apparatus using such an optical scanning apparatus.

Further, according to the present exemplary embodiment using tilt deflection, the amount of sag of the connecting portion between two surface vertexes (optical non-effective area) can be reduced. Thus, the effect of distortion of a lens surface is reduced at the light ray passing position adjacent to the connecting portion (optical non-effective area) between two surface vertexes where transferability at the time of formation is likely to decrease. Accordingly, deterioration of the spot shapes on the surfaces to be scanned can be reduced.

Further, according to the present exemplary embodiment, costs can be reduced, and production can be simplified (mass-productivity is improved), compared to a case in which an antireflection film is vapor-deposited on a lens surface to reduce unnecessary light. Especially in a case in which a plastic lens is used, which is widely used in recent years to reduce lens costs and improve mass-productivity, it is difficult to vapor-deposit an antireflection film, and costs increase.

The present exemplary embodiment can also reduce the size of an imaging optical system. Specifically, in a case in which the lens surface having two curved areas decentered parallel to the reference axis of the imaging optical system is moved closer to the deflection unit side in the direction of the reference axis (when size reduction is aimed) in the arrangement illustrated in FIG. 6, the space between the two surface vertexes in the sub-scanning cross section becomes narrower.

Thus, due to the connecting portion (optical non-effective portion) between the two surface vertexes where transferability at the time of formation tends to deteriorate, the lens surface tends to be distorted at a light ray passing position near the connecting portion. This can affect wave-front aberration on the photosensitive drum surfaces, which may deteriorate the spot shapes on the photosensitive drum surfaces. This has conventionally made it difficult to reduce the size in the direction of the reference axis.

On the other hand, according to the present exemplary embodiment using tilt deflection, the amount of sag of the connecting portion (optical non-effective portion) between the two surface vertexes can be reduced. Thus, the lens surface having two curved areas can be moved closer to the deflection unit side in the direction of the reference axis (the size can be reduced).

Further, if the connecting portion (optical non-effective portion) between the two surface vertexes is made a smooth curve (arc, nominal, etc.) so that distortion of the lens surface is less likely to occur, the area that can be used as an optical effective portion becomes narrower. This causes separation of a plurality of light fluxes passing through the optical effective portion, in the sub-scanning direction. Furthermore, it also makes increase of the height of the lens surface in the sub-scanning direction necessary. Thus, size reduction has been difficult.

On the other hand, according to the present exemplary embodiment using tilt deflection, the amount of sag of the connecting portion (optical non-effective portion) between the two surface vertexes can be reduced. Thus, the two curved areas of the lens surface do not have to be connected through a smooth curve (arc, nominal, etc.), making it possible to reduce the size in the direction perpendicular to the reference axis.

The following describes a second exemplary embodiment of the present invention. The present exemplary embodiment is different from the first exemplary embodiment in that the lens arrangement is changed, and with that change the shapes of the first image forming lens and the second image forming lens are also changed. The rest of the arrangement and optical action are similar to those of the first exemplary embodiment to obtain similar advantages.

(Optical Scanning System)

Lens surface shapes and optical arrangement according to the present exemplary embodiment are shown in Table 2 as specific numerical examples of an optical scanning system.

TABLE 2

| Imaging optical system data | | | |
|---|---|---|---|
| Oblique incidence angle in main-scanning cross section | [degree] | | 90 |
| Oblique incidence angle in sub-scanning cross section | [degree] | γ | 3 |
| fθ coefficient | [mm/rad] | f | 136 |
| Wavelength of light source | [nm] | λ | 790 |
| Refractive index of image forming lens | | N | 1.523972 |
| Maximum deflection angle | [degree] | θmax | ±23.17 |
| Deflection point - incident surface of image forming lens 61ym, 61ck | [mm] | D1 | 17.2 |
| Incident surface of image forming lens 61ym, 61ck - output surface of image forming lens 61ym, 61ck | [mm] | D2 | 6 |
| Output surface of image forming lens 61ym, 61ck - incident surface of image forming lens 62ym, 62ck | [mm] | D3 | 16.0 |
| Incident surface of image forming lens 62ym, 62ck - output surface of image forming lens 62ym, 62ck | [mm] | D4 | 5.0 |
| Output surface of image forming lens 62ym, 62ck - surface to be scanned | [mm] | D5 | 117.2 |
| Deflection point - surface to be scanned | [mm] | D | 161.4 |
| Effective scanning width | [mm] | W | 220 |
| Amount of shift of incident surface of image forming lens 62ym, 62ck in sub-scanning direction | [mm] | | 2.3 |
| Amount of shift of output surface of image forming lens 62ym, 62ck in sub-scanning direction | [mm] | | 2.3 |
| Number of surfaces of polygon mirror | [surface(s)] | | 4 |
| Diameter of circumscribed circle of polygon mirror | [φ] | | 20 |

TABLE 2-continued

Image forming lens shape data

| | | Image forming lens 61ym, 61ck | | Image forming lens 62ym, 62ck | |
|---|---|---|---|---|---|
| | | Incident surface | Output surface | Incident surface | Output surface |
| Main scanning | R | −51.160 | −27.606 | −300 | 639.363 |
| | K | 8.11E−01 | −9.56E−01 | −3.24E+02 | 1.45E+02 |
| | B4u | −2.75E−06 | 1.48E−06 | 1.97E−07 | −3.68E−06 |
| | B6u | 1.01E−08 | 3.26E−09 | −8.49E−10 | 1.65E−09 |
| | B8u | | −1.87E−11 | 2.70E−13 | −8.13E−13 |
| | B10u | | 3.34E−14 | | 1.66E−16 |
| | B4l | −2.75E−06 | 1.48E−06 | 1.97E−07 | −3.68E−06 |
| | B6l | 1.01E−08 | 3.26E−09 | −8.49E−10 | 1.65E−09 |
| | B8l | | −1.87E−11 | 2.70E−13 | −8.13E−13 |
| | B10l | | 3.34E−14 | | 1.66E−16 |
| Sub-scanning direction | r | 20 | 10.211 | 93 | −14.722 |
| | D2u | | −9.95E−05 | 5.25E−06 | 5.14E−05 |
| | D4u | | 8.82E−08 | −1.31E−07 | −1.35E−07 |
| | D6u | | 9.96E−11 | 2.69E−10 | 1.83E−10 |
| | D8u | | | −2.16E−13 | −1.17E−13 |
| | D10u | | | 6.27E−17 | 2.81E−17 |
| | D2l | | −5.07E−05 | 5.25E−06 | 4.77E−05 |
| | D4l | | −8.26E−08 | −1.31E−07 | −1.33E−07 |
| | D6l | | 2.88E−10 | 2.69E−10 | 1.89E−10 |
| | D8l | | | −2.16E−13 | −1.25E−13 |
| | D10l | | | 6.27E−17 | 3.11E−17 |
| | M0_1u | | | 1.97E−02 | −1.02E−01 |
| | M2_1u | | | −6.81E−06 | 7.61E−05 |
| | M4_1u | | | 2.03E−08 | −6.57E−08 |
| | M6_1u | | | 4.61E−11 | 3.49E−11 |
| | M8_1u | | | 3.22E−14 | −1.80E−14 |
| | M10_1u | | | −6.95E−18 | 5.73E−18 |
| | M0_1l | | | 1.97E−02 | −1.02E−01 |
| | M2_1l | | | 3.31E−05 | 9.41E−05 |
| | M4_1l | | | −7.74E−08 | −9.80E−08 |
| | M6_1l | | | 5.26E−11 | 4.41E−11 |
| | M8_1l | | | −1.26E−14 | −4.43E−15 |
| | M10_1l | | | −2.26E−18 | −3.30E−18 |

In the present exemplary embodiment, each of the incident surface and the output surface of the first image forming lens and the incident surface of the second image forming lens is arranged to have a convex shape in the sub-scanning cross section with respect to the deflection unit, as in the first exemplary embodiment. Therefore, ghost light generated and reflected by any of the surfaces is emitted in directions coming away from the reference axis C0 and blocked by the first light blocking member 30. Thus, the ghost light will not cause a problem.

Further, the output surfaces of the second image forming lens are tilt-decentered in the sub-scanning cross section treating the main scanning direction as the rotational axis, as in the first exemplary embodiment. Therefore, ghost light generated by the output surface of the second image forming lens is emitted in the direction approaching the reference axis C0 and blocked by the first light blocking member 30.

Figure 9:
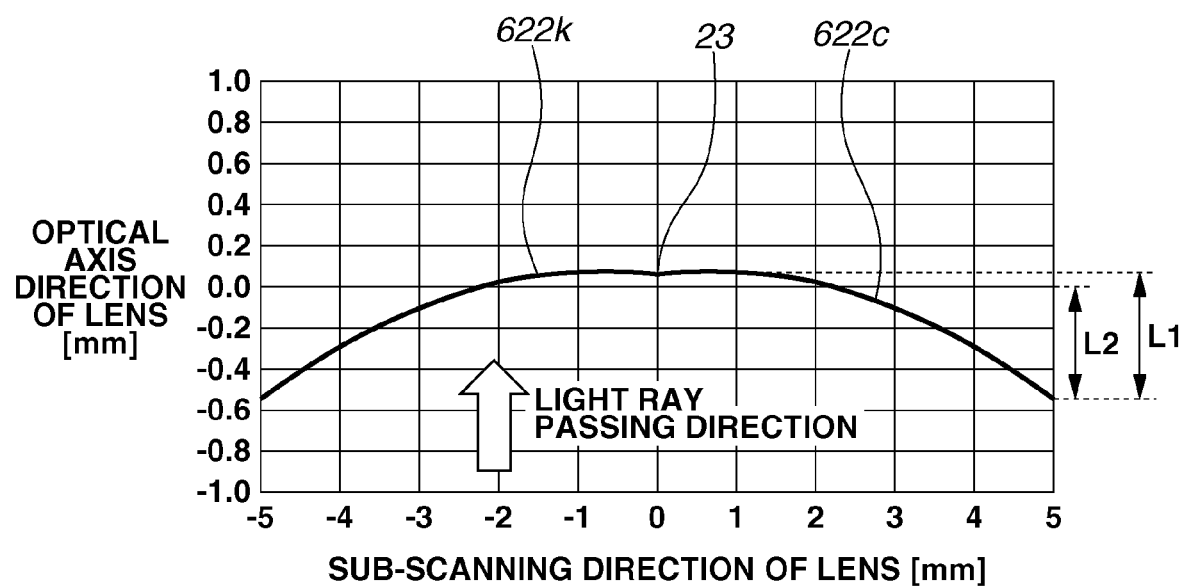
FIG. 9 is an enlarged view of an output surface of a second image forming lens according to a second exemplary embodiment of the present invention.

FIG. 9 illustrates an enlarged view of the output surfaces 622c and 622k of the second image forming lens 62ck according to the present exemplary embodiment. As described above, the output surfaces 622c and 622k of the second image forming lens 62ck are tilt-decentered in the sub-scanning cross section treating the main scanning direction as the rotational axis, so that the amount of sag of the connecting portion 23 between the output surfaces 622c and 622k of the second image forming lens 62ck can be reduced, as illustrated in FIG. 9.

In the present exemplary embodiment, the amount of sag is 0.12 mm, so that the sag is not likely to generate peculiarity that affects a light flux.

Figure 10:
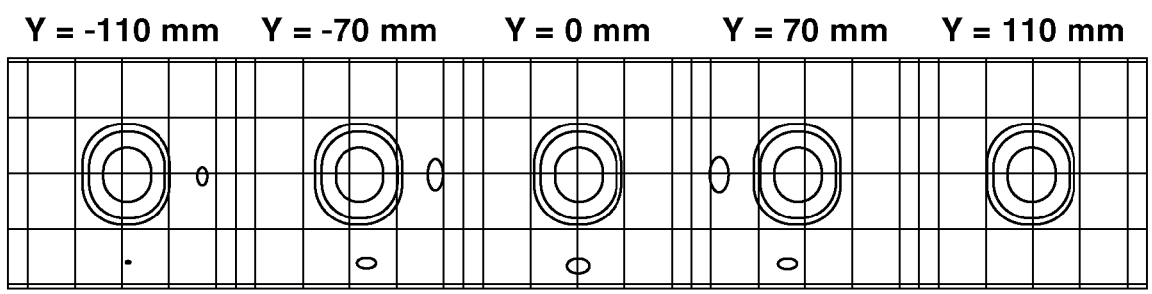
FIG. 10 illustrates spot diameters according to the second exemplary embodiment of the present invention.

FIG. 10 illustrates spot shapes according to the present exemplary embodiment. In the present exemplary embodiment, the lens surface is tilt-decentered treating the main scanning direction as the rotational axis so that ghost light does not reach the surfaces to be scanned and, at the same time, it can be seen that the spot rotation is suitably corrected.

In the present exemplary embodiment, an angle θs between a principal light ray of a light flux incident on an output surface of an imaging optical element that is disposed at a position closest to the surfaces to be scanned in the optical path, and a surface normal line at a position through which the light flux enters the output surface is set as follows:

θs=3.24 (deg).

This satisfies the conditional formula (1).

In the present exemplary embodiment, a distance L1, which is a distance in the optical axis direction between a mirror surface end position of the output surface of the imaging optical element disposed at the position closest to the surfaces to be scanned in the optical path, and the central position of the output surface in the sub-scanning cross section, and a distance L2, which is a distance in the optical axis direction between the mirror surface end position and a light flux incident position, are set as follows:

L1=0.61 (mm), and

L2=0.56 (mm).

This satisfies the conditional formula (2).

As to the imaging optical element disposed at the position closest to the deflection unit 5 in the optical path, an angle between the principal light ray of the light flux reflected by the incident surface illustrated in FIG. 2 and the reference axis is θgs1, and an angle between the principal light ray of the light flux reflected by the output surface as illustrated in FIG. 3 and the reference axis is θgs2. As to the imaging optical element disposed at the position closet to the surfaces to be scanned in the optical path, an angle between the principal light ray of the light flux reflected by the incident surface illustrated in FIG. 4 and the reference axis is θgs3, and an angle between the principal light ray of the light flux reflected by the output surface illustrated in FIG. 1C and the reference axis is gs4. Then, the values of the angles θsg1, θsg2, θsg3, and θsg4 in the present exemplary embodiment are as follows:

$$sg1 = -8.3 \text{ (deg)},$$

$$sg2 = -12.5 \text{ (deg)},$$

$$sg1 = -3.0 \text{ (deg), and}$$

$$sg1 = 8.4 \text{ (deg)}.$$

Thus, the conditional formulas (3), (4), (5), and (6) are satisfied.

The following describes a third exemplary embodiment of the present invention. The present exemplary embodiment is different from the first exemplary embodiment in that a light blocking member is provided between the first image forming lens and the second image forming lens and, is provided, in the sub-scanning cross section, between a plurality of light fluxes deflected for scanning by the same deflection surface of the deflection unit. The rest of the arrangement and optical action are similar to those of the first exemplary embodiment to obtain similar advantages.

Figure 11:
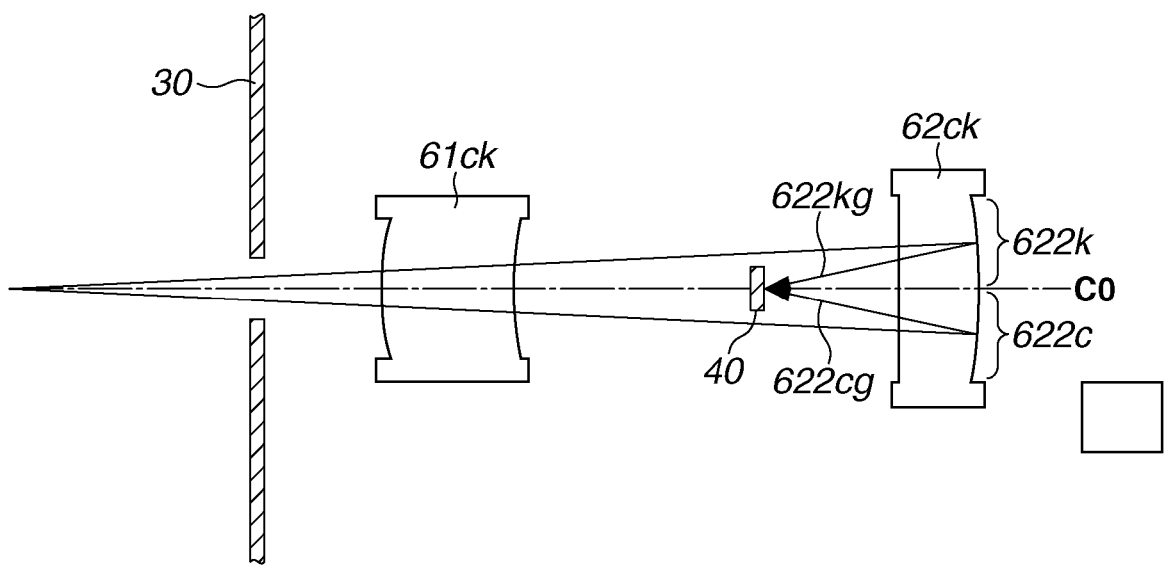
FIG. 11 is a sub-scanning cross sectional view illustrating ghost light generated by an output surface of a second image forming lens according to a third exemplary embodiment of the present invention.

FIG. 11 is a sub-scanning cross sectional view showing ghost light generated by the output surface of the second image forming lens according to the present exemplary embodiment. The output surface 622c of the second image forming lens 62ck is tilt-decentered in the direction CCW, and the output surface 622k is tilt-decentered in the direction CW, treating the main scanning direction as the rotational axis. As a result, ghost light rays 622cg and 622kg generated by the output surfaces 622c and 622k intersect each other between the first image forming lens and the second image forming lens. Further, in the sub-scanning cross section, the ghost light rays 622cg and 622kg intersect each other between a plurality of light fluxes deflected for scanning by the same deflection surface of the deflection unit.

According to the present exemplary embodiment, the second light blocking member 40 is provided together with the first light blocking member 30. The second light blocking member 40 is disposed between the first image forming lens and the second image forming lens and, in the sub-scanning cross section, and disposed in an area between a plurality of light fluxes deflected for scanning by the same deflection surface of the deflection unit. This can more effectively block the ghost light rays 622cg and 622kg generated by reflection on the output surface 622ck of the second image forming lens 62ck. Thus, the ghost light is less likely to reach the surfaces to be scanned.

Modified Example 1

While the foregoing exemplary embodiments describe the first light blocking member 30 provided to block reflection light (ghost light) from the lens surface, reflection light (ghost light) from the lens surface may simply be dispersed and scattered in a housing of an apparatus without a light blocking member.

Modified Example 2

In the foregoing exemplary embodiments, the output surface of the imaging optical element (62ck) disposed at a position closest to the surfaces to be scanned in the optical path includes a plurality of curved areas decentered parallel to the reference axis of the imaging optical system in the sub-scanning cross section. The incident surface of the imaging optical element (62ck) disposed at a position closest to the surfaces to be scanned in the optical path can also include a plurality of curved areas decentered parallel to the reference axis of the imaging optical system in the sub-scanning cross section.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-084686 filed Apr. 15, 2013, which is hereby incorporated by reference herein in its entirety.

What is claimed is:

1. An optical scanning apparatus comprising:
   a deflection unit configured to deflect first and second light fluxes in a main scanning direction by a same deflection surface;
   an incident optical system configured to cause the first and second light fluxes to enter the deflection surface; and
   an imaging optical system configured to converge the first and second light fluxes deflected by the deflection unit to first and second surfaces to be scanned, respectively,
   wherein the imaging optical system includes a first imaging optical element having an output surface including first and second curves that the first and second light fluxes respectively enter, and
   wherein among light rays included in the first and second light fluxes, the light rays that are reflected by the first and second curves intersect each other in a sub-scanning cross section perpendicular to the main scanning direction.

2. The optical scanning apparatus according to claim 1, wherein each of the first and second curves has a shape concave toward the deflection unit in the sub-scanning cross section.

3. The optical scanning apparatus according to claim 1, wherein an incident surface of the first imaging optical element has a shape convex toward the deflection unit in the sub-scanning cross section.

4. The optical scanning apparatus according to claim 3, wherein the incident surface includes first and second curves that the first and second light fluxes respectively enter.

5. The optical scanning apparatus according to claim 1, wherein the imaging optical system includes a plurality of imaging optical elements, and the first imaging optical element is closest to the surface to be scanned in an optical path among the plurality of imaging optical elements.

6. The optical scanning apparatus according to claim 5, wherein an incident surface and an output surface of second imaging optical element that is closest to the deflection unit in the optical path among the plurality of imaging optical elements has a shape convex toward the deflection unit in the sub-scanning cross section.

7. The optical scanning apparatus according to claim 5, further comprising a second light blocking member,
wherein the second light blocking member is disposed between the first imaging optical element and second imaging optical element that is closest to the deflection unit in the optical path among the plurality of imaging optical elements, and is configured to block the light rays that are reflected.

8. The optical scanning apparatus according to claim 7, wherein in the sub-scanning cross section, the second light blocking member is disposed between the first and second light fluxes deflected by the deflection unit.

9. The optical scanning apparatus according to claim 1, wherein $|r1|>|r2|$ is satisfied, where r1 represents a curvature radius of an incident surface of the first imaging optical element in the sub-scanning cross section, and r2 represents a curvature radius of each of the first and second curves.

10. The optical scanning apparatus according to claim 1, further comprising a first light blocking member disposed between the deflection unit and the imaging optical system and configured to block the light rays that are reflected.

11. The optical scanning apparatus according to claim 1, wherein L1>L2 is satisfied, where L1 represents a distance in an optical axis direction between a mirror surface end position of each of the first and second curves and a central position of each of the first and second curves in the sub-scanning cross section, and L2 represents a distance in the optical axis direction between the mirror surface end position and incident positions of the first and second light fluxes in the sub-scanning cross section.

12. The optical scanning apparatus according to claim 1, wherein the first and second curves have shapes defined by different functions, and a boundary portion of the first and second curves has a discontinuous slope in the sub-scanning cross section.

13. The optical scanning apparatus according to claim 1, wherein each of the first and second curves is tilt-decentered such that light rays that are reflected by the first and second curves intersect each other in the sub-scanning cross section perpendicular to the main scanning direction.

14. The optical scanning apparatus according to claim 1, further comprising:
a second incident optical system configured to cause third and fourth light fluxes to enter a second deflection surface that is different from the deflection surface; and
a second imaging optical system configured to converge each of the third and fourth light fluxes deflected by the deflection unit to third and fourth surfaces to be scanned, respectively.

15. The optical scanning apparatus according to claim 1, wherein the first imaging optical element is closest to the surface to be scanned in an optical path among one or more imaging optical elements included in the imaging optical system.

16. An image forming apparatus comprising:
an optical scanning apparatus including:
a deflection unit configured to deflect first and second light fluxes in a main scanning direction by a same deflection surface;
an incident optical system configured to cause the first and second light fluxes to enter the deflection surface; and
an imaging optical system configured to converge the first and second light fluxes deflected by the deflection unit to first and second surfaces to be scanned, respectively,
a developing unit configured to develop as a toner images an electrostatic latent image formed by the optical scanning apparatus on a photosensitive surface of each of first and second photosensitive members disposed on the first and second surfaces to be scanned;
a transfer device configured to transfer the developed toner image onto a transfer material; and
a fixing device configured to fix the transferred toner image onto the transfer material,
wherein the imaging optical system includes first imaging optical element having an output surface including first and second curves that the first and second light fluxes respectively enter, and
wherein among light rays included in the first and second light fluxes, the light rays that are reflected by the first and second curves intersect each other in a sub-scanning cross section perpendicular to the main scanning direction.

17. The image forming apparatus according to claim 16, further comprising a printer controller configured to convert a color signal input from an external device into image data to input the image data into the optical scanning apparatus.

* * * * *